United States Patent [19]

Friedman

[11] Patent Number: 4,512,407
[45] Date of Patent: * Apr. 23, 1985

[54] SAND CONSOLIDATION METHODS USING ADSORBABLE CATALYSTS

[75] Inventor: Robert H. Friedman, Houston, Tex.

[73] Assignee: Getty Oil Company, Houston, Tex.

[ * ] Notice: The portion of the term of this patent subsequent to Jan. 24, 2001 has been disclaimed.

[21] Appl. No.: 561,970

[22] Filed: Dec. 15, 1983

Related U.S. Application Data

[63] Continuation-in-part of Ser. No. 271,426, Jun. 8, 1981, Pat. No. 4,427,069.

[51] Int. Cl.$^3$ ............................................ E21B 33/138
[52] U.S. Cl. ..................................... 166/295; 166/300
[58] Field of Search ............... 166/270, 288, 276, 295, 166/300

[56] References Cited

U.S. PATENT DOCUMENTS

| | | | |
|---|---|---|---|
| 2,604,172 | 7/1952 | Wrightsman | 166/281 |
| 3,373,813 | 3/1968 | Jennings et al. | 166/295 |
| 3,544,530 | 12/1970 | Shaffer | 260/785 |
| 3,548,944 | 12/1970 | Hess | 166/295 |
| 3,612,181 | 10/1971 | Brooks, Jr. | 166/300 X |
| 3,630,285 | 12/1971 | Claytor, Jr. et al. | 166/300 |

FOREIGN PATENT DOCUMENTS

| | | |
|---|---|---|
| 1172116 | 11/1969 | United Kingdom . |
| 1247856 | 9/1971 | United Kingdom . |
| 1345774 | 2/1974 | United Kingdom . |
| 1422672 | 1/1976 | United Kingdom . |
| 1511589 | 5/1978 | United Kingdom . |

OTHER PUBLICATIONS

Modern Plastics Encyclopedia, p. 124, (1970-1971).

Primary Examiner—George A. Suchfield
Attorney, Agent, or Firm—Arnold, White & Durkee

[57] ABSTRACT

Methods are provided for selectively consolidating sand grains within a subterranean formation. First an acidic zirconium salt catalyst, such as $ZrOCl_2$, $Zr(SO_4)_2$, or $ZrCl_4$, is injected into the subterranean formation, wherein the acidic salt catalyst is adsorbed to the surface of the sand grains. Next a polymerizable resin composition such as furfuryl alcohol oligomer is introduced into the well formation. Polymerization of the resin occurs upon exposure to the elevated well temperatures and contact with the acid salt catalyst adsorbed to the sand grains. The polymerized resin serves to consolidate the surfaces of the sand grains while retaining permeability through the pore spaces. An ester of a weak organic acid is included with the resin compositions to control the extent of a polymerization by consuming the water by-product formed during the polymerization reaction.

12 Claims, No Drawings

SAND CONSOLIDATION METHODS USING ADSORBABLE CATALYSTS

BACKGROUND OF THE INVENTION

This is a continuation in part application of copending application Ser. No. 271,426 filed June 8, 1981, now U.S. Pat. No. 4,427,069.

This invention relates to methods of sand consolidation or profile control in subterranean formations. More particularly, the invention relates to improved methods for selectively consolidating the surface of sand grains in-situ using site specific catalysts.

Sand consolidation is a near wellbore treatment of a producing well. Surrounding a wellbore in many instances are highly porous and fragmentable sand formations. Under production conditions, the sand is often displaced from its aggregated structure and carried along by fluid flood operations to a producing well. If the sand flow is allowed to proceed unchecked the producing wellbore soon becomes full of sand, thereby clogging oil production. Furthermore, sand arriving at the surface of the well wears out the production hardware.

It has therefore been the subject of extensive research by the petroleum industry to develop techniques to minimize or obviate displacement of sand particles into producing well areas. One such general approach suggested in the art is to consolidate the porous sand structures. Sand consolidation techniques are aimed at cementing loose sand structure adjacent a wellbore. Such consolidation is necessary to prevent breakdown of sand formations and subsequent clogging of producing wells.

The major feature of sand consolidation is to make a sieve next to the producing wellbore such that oil can reach the wellbore while sand flow is retarded. The sieve is composed of sand formations already present surrounding the wellbore area cemented together by consolidating material added to the formations. The consolidation need only be thick enough to prevent sand breakdown adjacent to the wellbore. Ordinarily sand consolidation is effected for six to eight inches around the periphery of the wellbore.

Accordingly, the criteria for good sand consolidation are as follows. First, the consolidation structure should hold back sand particles while preserving high permeability. As consolidating material is added to sand formation, this material will necessarily occupy part of the pore space causing permeability reduction. Therefore, an object of practical sand consolidation is to minimize occlusion of pore spaces so that oil can flow to producing wellbore.

Second, durability is a desired feature of sand consolidation. The thin film of consolidating material holding the sand grains should be physically durable in resisting deterioration by oil, water, and other fluids in the formation. In particular, the consolidated structure should be resistant to high temperature degradation induced by steam displacement operations.

Third, the consolidation action should not set up in the wellbore prematurely thereby occluding the wellbore path for oil production.

Further, the consolidation operation should be simple, efficient, and inexpensive. The economic significance of such an operation is great and the problems described above have been well recognized by the petroleum industry for many years. Many efforts have been made to satisfy these problems in whole or in part.

One particular approach to sand consolidation has been to inject into a well a polymerizable resin which polymerizes within the well formation upon exposure to the elevated well temperature. The polymer material forms a viscous mass which readily adheres to the porous sand structures. As the sand surfaces become coated, they no longer are subject to displacement when exposed to fluid flow. Unfortunately, the polymerization reaction is difficult to control so as to only consolidate the sand grains without plugging the pore spaces and ultimately blocking permeability through the porous strata.

One of the better sand consolidating agents for high temperature wells is a polymerized furfuryl alcohol resin. The material resists heat as well as oil and water. The problem is using this material is in catalyzing the polymerization. If delayed action catalyst is carried in a mixture containing the furfuryl alcohol oligomer, polymerization may occur too early causing wellbore blockage or too extensively so that permeability is lost; or alternatively, polymerization may not occur at all or be inadequate to effect consolidation.

The technique described by the present invention represents an improvement over the methods used previously, in that polymerization and consequently consolidation of the sand positively occurs and occurs only adjacent to the sand grains, thus preserving most of the original permeability. The polymerization reactions disclosed are effected by an acidic material and happen only where the acidic material is present. By injecting a solution of an acidic salt catalyst, the salt selected as one which is adsorbed by sand or rock, the catalyst is present exactly where needed.

SUMMARY OF THE INVENTION

This invention relates to improved consolidation methods for low temperature subterranean formations. Low temperature formations include those formations having an ambient temperature of about 100° F. to about 250° F. The methods involve, first, the injection of a zirconium acid salt catalyst into a subterranean well formation. The zirconium salt is physically adsorbed onto sand grains located within the well formation, whereby the salt catalyst forms a dispersed layer on the surface of the sand grains. Next a polymerizable resin composition is injected into the well formation. As the polymerizable resin contacts the adsorbed zirconium acid catalyst, the combined influences of the elevated well temperatures and catalyst cause the resin to form a polymer which coats or consolidates the surface of the sand grains. That resin which does not contact the acidic salt catalyst does not polymerize. Permeability of the well formation is maintained because consolidation only occurs adjacent to the sand particles at the site of the dispersed acid catalyst, and polymerization does not occur in the pore spaces where there is no catalyst present.

If the well temperature is in the lower ranges of 100°–150° F., then the polymerization resin composition can desirably include an amount of acid catalyst; the amount of acid catalyst being insufficient to cure the resin absent additional exposure to the adsorbed acid salt. Examples of such acid catalysts are well known in the art; including but not limited to halogenated organic acids; chloroacetic acid; chloropropionic acid; chlorobenzioc acid; oxalic acid; phthalic acid; and acid salt catalysts described herein and applicant's copending application Ser. No. 271,426, filed June 8, 1981.

An ester of weak organic acid can also be injected into the well formation to assure that polymerization goes forward. As the polymerization reaction proceeds, water is produced as a by-product. The included ester serves to consume the water in a hydrolysis reaction.

DETAILED DESCRIPTION OF PREFERRED EMBODIMENTS

The invention relates to improved sand consolidation methods, which are effective and durable at relatively low temperatures and to production fluid flow, the consolidation lasting a relatively long time span and effective at a relatively low temperature.

The methods provided comprise sequential treatment of well formations with compositions comprising an zirconium acid salt catalyst followed with compositions comprising polymerizable resins. In each instance the resins react in the formation when in contact with the adsorbed zirconium acid salt catalyst to produce a polymerized resin which is effective to consolidate sand formations. Further, the methods of this invention provide that the resins polymerize adjacent to the site of the sand grain thereby consolidating only the sand while substantially preserving the permeability of the well formation.

The invention will be described in terms of preferred embodiments, which represent the best mode of the invention known to the inventor at the time of this application.

In accordance with a first embodiment of the invention, an acid zirconium salt catalyst is provided. Examples of acid zirconium salt catalysts which are desirably useful in practicing the present invention include but are not limited to $ZrOCl_2$, $Zr(SO_4)_2$, and $ZrCl_4$. Selection of the particular acid salt for use in the present invention is dictated by the requirement that salt adsorbs to sand particles surrounding the wellbore. For this purpose it is preferred that the salt feature a high charged density cation, i.e., high charge relative to size. For low temperature formations a quadravalent cation is therefore preferred. Such cations adsorb more tenaciously on the generally negatively charged rock or sand. More particularly, Applicant has observed that the zirconium cation salts favor low temperature catalysis of polymerization reactions.

Polymerization of the resin which is used to consolidate the sand is acid catalyzed. The rate of polymerization is increased by strength of the acid and by temperature. At sufficiently high temperature, say 500° F., polymerization will occur even without an acid catalyst. If the resin is treated with strong acid, polymerization will occur even at room temperature. In a good consolidation, the operator wants consolidation to occur at a rate slow enough to get all of the resin placed before polymerization takes place and rapidly enough so that well shut-in time is minimized.

Generally, these constraints have been interpreted to mean that the operator would prefer to have 12–24 hours of working time available so that even with a mishap like a pump malfunction, the resin could still be placed before polymerization. Further, polymerization ought to permit putting the well on production within 48–72 hours of beginning the job.

A solution of the zirconium acid salt catalyst, preferably $ZrOCl_2$, is injected into a wellbore containing sand formations to effect consolidations at relatively low temperatures. However, prior to injecting the zirconium acid salt catalyst, it is recommended that the sand be cleaned to facilitate subsequent catalyst adsorption. A suction/pressure washing with an organic solvent such as diesel oil will effectively clean the sand.

The salt solution introduced to the wellbore is desirably a saturated solution. This is to conserve fluid volume and to enhance adsorption. Adsorption or plating from solution increases with ion concentration. There is no particular relationship between volume of salt solution introduced to reservoir volume. The intent of this consolidation process is to consolidate from six to eight inches of sand surrounding the wellbore. Typically, the volume of salt solution introduced to the wellbore is approximately three times the volume necessary to fill the six inch volume surrounding the injection wellbore. Once within the well formation, the salt is strongly adsorbed by the sand grains thereby creating a dispersed coating of acidic salt catalyst on the surface of the sands.

Further, in accordance with the preferred embodiment of the present invention, a resin is introduced to the wellbore following the introduction of the acid zirconium salt solution. There are certain readily available and inexpensive polymerizable resins, which polymerize upon exposure to heat and contact with an acid catalyst.

For example, in practicing sand consolidation, furfuryl alcohol oligomer, $(C_4H_3OCH_2O)_xH$, is a relatively inexpensive polymerizable resin which auto-polymerizes upon exposure to acid catalysts forming a thermosetting resin which cures to an insoluble mass highly resistant to chemical attack and thermal degradation. Specifically, it is recommended that the resin used by Quacorr 1300, marketed by Quaker Oats. This particular resin is favored because it is oil soluble and when polymerized it will withstand high temperature conditions, as high as 700° F. In practicing profile control methods involving larger volumes of sand consolidation it is preferred to use furfuryl alcohol monomer in addition to the furfuryl alcohol oligomer.

The furfuryl alcohol oligomer may be desirably diluted with an appropriate solvent such as butyl acetate to decrease viscosity of the fluid such that it can be manageably introduced into the borehole. Following the introduction of the salt solution, resin injection may follow immediately. However, care must be taken to prevent premature contact of the resin composition with the salt catalyst in the wellbore. If such contact is made, the resin will polymerize and occlude the wellbore. In practice, a barrel or more of solvent is injected into the wellbore after the salt injection, flushing the wellbore of residual salt catalyst. Following this buffer zone the resin is introduced.

Zirconyl chloride is adequate for consolidations down to below 200° F. At lower temperatures, down to 120° F. the quantity of catalyst which can be adsorbed on the rock is often inadequate to catalyze the reaction in a reasonable time. A variant of the present invention useful for this situation is to premix into the resin an acidic material. The acid content of the premix is sufficiently low so that the premixed resin will not polymerize for a long time at any temperature it is likely to experience, yet the quantity of acid in the premix plus the amount adsorbed on the rock is adequate to cause polymerization. This permits the resin mixture to be prepared by the manufacturer, shipped and stored for a reasonable period and then used by the operator without hazard of premature polymerization.

Several materials have been considered for the premix acid. The criteria for selection are rather severe. It is preferred that shelf life be maximum, and that consolidation be possible at low temperature. Ease of premixing is also of concern. Recent work has shown that the best choice for premix acid is a small fraction of organic acids, preferably a halogenated organic acid such as chloroacetic acid or a dilute concentration of an acid salt catalyst.

As the furfuyl alcohol oligomer comes into contact with the adsorbed acidic catalyst, the action of the heat in the formation and catalyst drives the auto-polymerization reaction forward. Thus, the alcohol oligomer polymerizes to a resin mass at the site of the catalyst adsorbed to the sand grains.

Resin which does not contact the acid catalyst does not polymerize. The adsorbed acid catalyst on the sand grains provides a site-specific polymerization catalyst only where needed, thus resulting in a site selective consolidated sand coating. A consolidation made in this manner is able to withstand oil circulation to at least 400° F.

As the polymerization reaction proceeds, water is produced as a by-product. If this water production is allowed to go unchecked, the polymerization reaction will soon equilibrate:

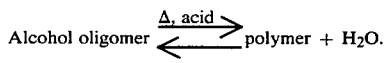

By providing an ester or anhydride of a weak organic acid to the reaction site, the by-product water is consumed in a hydrolysis reaction of the ester or anhydride to its corresponding alcohol and carboxylic acid. For example, the inclusion of an ester of a weak organic acid, widely available as inexpensive organic solvents, with the polymerizable resin composition serves both as the solvating agent for the polymerizable resin and as an ester to check water production. Accordingly, the polymerization reaction is driven to the desired degree of completion by the uptake of water in the ester hydrolysis reaction:

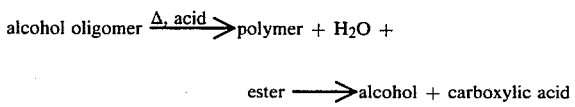

The choice of the ester diluent will depend on a number of factors such as availability, cost, ease of hydrolysis, and nature of the acid formed. Care must be taken that the acid formed upon ester hydrolysis is insufficiently strong to independently catalyze the resin polymerization reaction, thereby losing the site specificity provided by the acid salt catalyst adsorption mechanism. Examples of esters which are easily hydrolyzed to weak acids under formation conditions, include but are not limited to ethyl, propyl or butyl acetate and phthalic or glutaric anhydrides.

The implementation and practice of the methods of the present invention ideally involve the consolidation of a monolayer of the sand surfaces, without consolidation of resin within the pore spaces. Resin consolidation development within the pore spaces causes a loss of permeability and correspondingly blocks production fluid flow.

In the practice of the methods of the present invention, there exists a dynamic equilibrium between adsorbtion and desorption of the acidic salt ion components with respect to the particular sand particles. The balance of equilibrium is of course affected by various factors including the concentration of ions injected, the available adsorbtion sites presented by the sands to the ions and the environmental temperature. A variation in any one of those factors will predictably shift the equilibrium to one direction or the other. If the equilibrium of reaction is shifted toward desorption, then a higher concentration of acidic salt catalyst is presented unbound in the pore spaces as opposed to bound on the sand surface. Upon subsequent contact with the polymerizable oligomer, the desorbed catalyst initiates resin consolidation in the pore spaces in addition to the consolidation effected at the sand surface sites. Since the polymerization reaction is concentration dependent, the concentration of desorbed catalyst effects the extent of polymerization and thickness of consolidation film or mass. The thickness of the consolidation is directly related to the magnitude of the concentration gradient of diffused catalyst. At some distance from the sand surface, where the catalyst population is too low to effect polymerization, there is consolidation.

For example, it has been noted in the course of implementation of the present invention, that certain sands pose certain desorbtion problems and corresponding permeability reduction. Kern River Field sand is noted as a sand possessing a high number of adsorption sites per given surface area. After injection of the acidic salt catalyst into the well formation, the catalyst adsorbs to the sand surface resulting in a high population density of adsorbed catalyst per given surface area. Upon subsequent contact with the polymerization resin, an exothermic polymerization reaction occurs. The additional heat generated by the reaction induces a portion of the adsorbed catalyst to desorb. The desorbed catalyst diffuses from the sand into the pore spaces, thereby establishing a concentration gradient of unbound catalyst.

Because certain sands adsorb more catalyst per given area than other sands, the population or concentration of catalyst which diffuses some distance from the sand surface into the pore spaces is correspondingly greater than the concentration gradient established for other sands after heating. Thus, this extent of subsequent consolidation occluding the pore space is greater for these sands. This in turn results in poor permeability.

The solution to the problem involves the cotemporaneous injection of a second adsorbent salt with the acidic salt catalyst. The second adsorbent salt is selected from those salts which possess adsorbtivity toward the sand but which will not catalyze the polymerization reaction. For example, in the preferred embodiment $MgCl_2$ is used as the second adsorbent salt. $MgCl_2$ which exhibits an effective pH of 7 in solution, will not initiate polymerization of the furfuryl oligomer. However, $Mg^{++}$ cation adsorbs to the sand just as $Zr^{++++}$ does. The result is that some of the adsorption sites are satisfied with magnesium. Upon desorption, there exists a lower concentration gradient of zirconium than otherwise would exist absent the magnesium adsorption. This lower concentration of zirconium present in the pore is inadequate to effect consolidation of the pore spaces. Consequently good consolidation is effected substantially at the sand surface without involvement of the pore spaces, thereby preserving permeability.

It is therefore apparent from the foregoing description that in situ adsorption density and resultant desorbtion concentration of acidic catalyst may be modified and regulated by the addition of a second adsorbent salt.

After the polymerization reaction has proceeded to the desired extent of completion, a base such as 1.0 N NaOH may be added to well injectants, neutralizing the acids and subsequently halting the catalysis of the oligomer polymerization and ester hydrolysis. The addition of the base is not an essential nor preferred step of the sand consolidation embodiments of the invention, but may be desired as a matter of convenient clean-up. Moreover, to reverse the consolidation process, an oxidizing agent such as hypochlorite bleach can be added to the wellbore.

Once the sands have been consolidated by the presence of the polymerized resin, oil production is resumed without observing reduction of permeability in the producing formation.

To further illustrate the invention, applicant has performed several laboratory experiments involving sand packs which have good permeability, not more than a 50% reduction of permeability, after sand consolidation according to the embodiments of the invention. The examples which follow, which should not be considered as limiting the invention but rather only as exemplary of the various embodiments are based on those laboratory results.

All experiments were conducted in ½" diameter×6" long pipe nipples, packed with sand (flint shot 24–32 mesh) and closed with stainless steel caps.

In each case the sand pack was initially evacuated and charged with water containing 3% sodium chloride, measuring approximately 90 ml pore volume.

EXAMPLE I

Premixes of Quacorr 1300 and n-butyl acetate (80:20 by weight) with an admixture of 0.5%–1.0% chloroacetic acid were prepared by dissolving the chloroacetic acid in the n-butyl acetate before the ester was added to resin. The premixes were placed in ovens at 120° F. and 140° F. for one week. The premixes remained quite stable under these conditions.

Four pipe nipples were packed with solvent cleaned Ventura formation material and the sand was saturated with zirconium using 3 pore volumes of 13% zirconyl chloride, ($ZrOCl_2 \cdot 8H_2O$), in water. The cores were then washed with two pore volumes of water to remove any residual catalyst.

In two of the packed nipples, the water was displaced by two pore volumes of the resin, containing 0.5% chloroacetic acid, through each nipple. The water was displaced by two pore volumes of the resin, containing 1.0% chloroacetic acid, in the remaining two packed pipe nipples. One of the pipe nipples, containing a 0.5% admixture of chloroacetic acid, and one of the pipe nipples, containing a 1.0% admixture of chloroacetic acid were placed in an oven at 120° F.

The remaining nipples, containing a 0.5% admixture of chloroacetic acid and a 1.0% admixture of chloroacetic acid, were placed in an oven at 140° F. After a 4-day shut-in, with periodic examinations, the cores were examined and permeabilities tested on consolidated cores. Results after 96 hours are listed below.

| CONSOLIDATION RESULTS | | | |
|---|---|---|---|
| Temperature | % Chloroacetic Acid | Consolidation | Permeability |
| 120° F. | 0.5 | weak | — |
| 120° F. | 1.0 | strong | permeable |
| 140° F. | 0.5 | strong | 0 |
| 140° F. | 1.0 | strong | gravity flow |

EXAMPLE II

The 90 ml pore volume of salt water in the sand pack was first overdisplaced using 120 ml of 8.5% weight-/volume (w/v) zirconyl chloride ($ZrOCl_2$) aqueous solution. After equilibration, the solution was displaced with 120 ml of 4:1 (w/v) mixture of Quacorr 1300 (a partically polmerized furfuryl alcohol supplied by Quaker Oats) and propyl acetate.

After injection of the alcohol resin, the sand pack was heated overnight in an oven at 400° F. to cure the resin. Then one pore volume of 1.0 N NaOH was injected. Permeabilities were then measured according to standard techniques by timing the rate of flow of water through the sample pack, while maintaining a constant pressure in the sample pack.

Examination of the sand pack exhibited sand consolidation and good permeability.

EXAMPLE III

The salt water of the sand pack was displaced by 8.5 pore volumes of a saturated zirconium tetrachloride (3.2% by weight) prewash. After equilibration, the solution was in turn displaced by a solution which was 80% by weight Quacorr 1300 (Quaker Oats furfuryl alcohol oligomer and 20% ethyl acetate plus an added catalyst.

Each nipple was connected to a second nipple to permit resin expansion into the second nipple and placed in an oven at a given temperature. After being heated overnight (approximately 15 hours), the nipple was opened to disclose a firmly consolidated sand pack. The permeability of each nipple was then remeasured and is shown along with the percent retention of permeability.

| CONSOLIDATION RESULTS | | | | | |
|---|---|---|---|---|---|
| | Resin | | | Permeability (Darcies) | |
| Temp. (°F.) | Composition Catalyst | Prewash Composition | Initial | Final | % Retention |
| 150 | .4% $ZrCl_4$ | 3.2% $ZrCl_4$ | 10.2 | 9.8 | 96 |
| 200 | .4% $ZrCl_4$ | 8.0% $ZnCl_2$ | 10.4 | 9.9 | 95 |

Although the invention has been described in terms of particular embodiments which applicant believes to represent the best modes of the invention, it will be recognized by those skilled in the art that various changes may be made in the composition and method embodiments of this specification without departing from the scope of the invention as defined in the following claims.

What is claimed is:

1. A method for selectively consolidating sand grains surrounding a borehole in a relatively low temperature subterranean formation, comprising:
    providing an aqueous fluid composition of a zirconium acid salt catalyst, the zirconium salt effective to cure a polymerizable furfuryl alcohol oligomer resin and effective to adsorb the surface of sand grains;

passing the catalyst composition through said borehole and into the formation surrounding the borehole;

allowing the acidic salt catalyst to be adsorbed onto the surface of the sand grains, said acidic salt catalyst forming a dispersed acid salt catalyst layer on the surface of the sand grains;

providing a resin composition comprising polymerizable furfuryl alcohol oligomer resin;

following the passage of the catalyst composition into the formation, passing the resin composition through said borehole and into the formation surrounding the borehole; and polymerizing the resin at the site of the adsorbed acidic salt catalyst to form as a reaction product a polymer effective to consolidate the sand grains without substantially reducing the permeability through the consolidated formation.

2. The method according to claim 1 wherein the zirconium salt is a halide salt, oxyhalide salt, or sulfate salt.

3. The method according to claim 1 wherein the zirconium salt is $ZrOCl_2$ or $Zr(SO_4)_2$.

4. The method according to claim 1 wherein the resin composition includes an amount of acid catalyst, the amount of acid catalyst ineffective to polymerize the resin composition absent contact with the adsorbed zirconium acid salt catalyst at formation temperature.

5. The method according to claim 4 wherein the acid catalyst is an organic acid catalyst.

6. The method according to claim 4 wherein the acid catalyst is a halogenated organic acid.

7. The method according to claim 4 wherein the acid catalyst is chloroacetic acid.

8. A method for selectively consolidating sand grains surrounding a borehole in a relatively low temperature subterranean formation, comprising:

providing an aqueous fluid composition of a zirconium acid, salt catalyst, the zirconium salt effective to cure a polymerizable furfuryl alcohol oligomer resin and effective to adsorb the surface of sand grains;

passing the catalyst composition through said borehole and into the formation surrounding the borehole;

allowing the acidic salt catalyst to be adsorbed onto the surface of the sand grains, said acidic salt catalyst forming a dispersed acid salt catalyst layer on the surface of the sand grains;

providing a resin composition comprising polymerizable furfuryl alcohol oligomer resin and a water consuming agent, the water consuming agent comprising an ester or acid anhydride of a weak organic acid, the organic acid being insufficiently strong to catalyze the polymerization of the resin composition;

following the passage of the catalyst composition into the formation, passing the resin composition through said borehole and into the formation surrounding the borehole; and polymerizing the resin at the site of the adsorbed acidic salt catalyst to form as a reaction product a polymer effective to consolidate the sand grains without substantially reducing the permeability through the consolidated formation.

9. The method according to claim 8 wherein the ester is a lower alkyl acetate, the alkyl radical comprising 2 to 8 carbon atoms.

10. The method according to claim 8 wherein the ester is ethyl acetate, propyl acetate, or butyl acetate.

11. The method according to claim 8 wherein the anhydride is phthalic or glutaric anhydride.

12. The method according to claim 8 wherein the mixture of polymerizable resin and ester or anhydride comprise a ratio of about 4:1 (weight/volume) of resin to ester or anhydride.

* * * * *